United States Patent
Dementyev et al.

(10) Patent No.: US 10,987,980 B2
(45) Date of Patent: Apr. 27, 2021

(54) TIRE PRESSURE MONITORING SYSTEM FOR A VEHICLE

(71) Applicant: Huf Hülsbeck & Fürst GmbH & Co. KG, Velbert (DE)

(72) Inventors: Yevgen Dementyev, Wuppertal (DE); Stefan Mönig, Schwelm (DE); Igor Gorenzweig, Wuppertal (DE); Axel Dussinger, Bad Rappenau (DE); Benedikt Gamer, Walzbachtal (DE); Sven Arnoldo, Malsch (DE)

(73) Assignee: Huf Baolong Electronics Bretten GmbH, Bretten (DE)

( * ) Notice: Subject to any disclaimer, the term of this patent is extended or adjusted under 35 U.S.C. 154(b) by 215 days.

(21) Appl. No.: 16/082,984

(22) PCT Filed: Jan. 18, 2017

(86) PCT No.: PCT/EP2017/050941
§ 371 (c)(1),
(2) Date: Sep. 7, 2018

(87) PCT Pub. No.: WO2017/153071
PCT Pub. Date: Sep. 14, 2017

(65) Prior Publication Data
US 2019/0030966 A1   Jan. 31, 2019

(30) Foreign Application Priority Data

Mar. 10, 2016 (DE) .......................... 202016101336.4

(51) Int. Cl.
*B60C 23/04* (2006.01)
*G01L 17/00* (2006.01)

(52) U.S. Cl.
CPC ...... *B60C 23/0494* (2013.01); *B60C 23/0408* (2013.01); *G01L 17/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 2004/0055371 | A1* | 3/2004 | Sanchez | B60C 23/0494 73/146 |
| 2007/0295076 | A1* | 12/2007 | Blossfeld | B60C 23/0408 73/146.8 |
| 2012/0017672 | A1* | 1/2012 | Uh | B60C 23/0494 73/146.8 |

FOREIGN PATENT DOCUMENTS

| | | |
|---|---|---|
| DE | 102004048244 A1 | 6/2005 |
| DE | 102010050365 A1 | 5/2012 |

* cited by examiner

*Primary Examiner* — Xin Y Zhong
(74) *Attorney, Agent, or Firm* — Honigman LLP; Brandon C. Griffith; Jonathan P. O'Brien

(57) ABSTRACT

A tire pressure monitoring system for a vehicle, for ascertaining tire-specific parameters, includes a valve body, at least one fastening element, and a tire inflation pressure sensor with a housing in which is accommodated a sensor for determining at least one tire-specific parameter and for wirelessly transmitting the at least one tire-specific parameter to a control unit on the vehicle. The housing has a fastening region, and the valve body includes a fastening section. The fastening section of the valve body is detachably engaged with the fastening region of the housing with the aid of a fastening element. The fastening element is made as one piece with the housing of the tire inflation pressure sensor from a thermoplastic plastic.

20 Claims, 5 Drawing Sheets

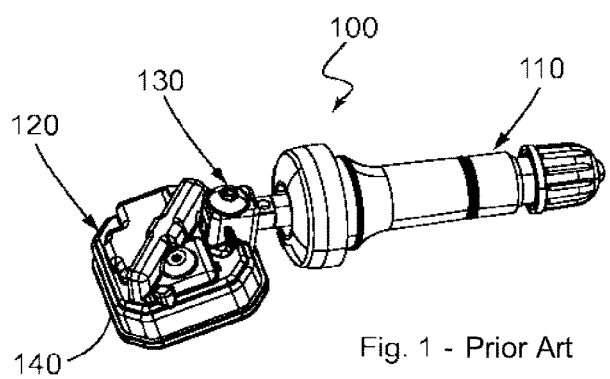
Fig. 1 - Prior Art
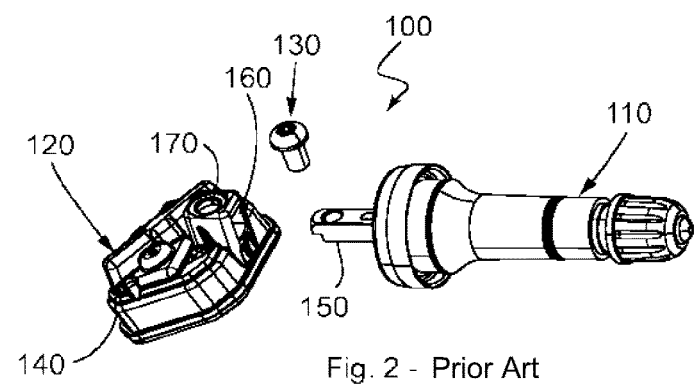
Fig. 2 - Prior Art
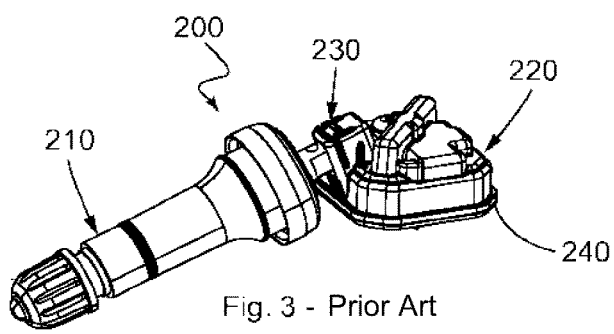
Fig. 3 - Prior Art
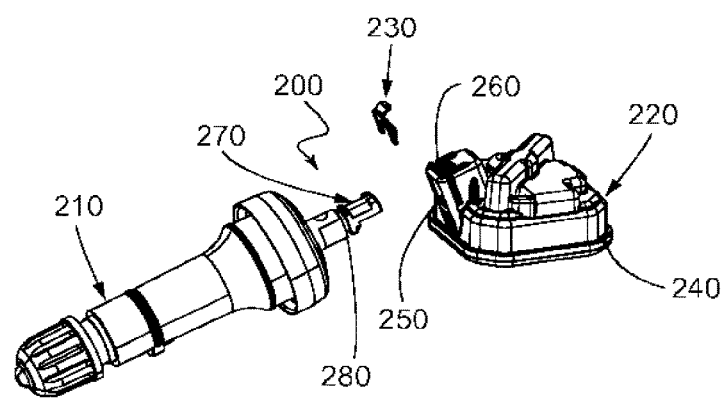
Fig. 4 - Prior Art

TIRE PRESSURE MONITORING SYSTEM FOR A VEHICLE

CROSS REFERENCE TO RELATED APPLICATIONS

This application is the national phase of International Application No. PCT/EP2017/050941, filed Jan. 18, 2017, which claims priority to German Application No. 20 2016 101 336.4, filed Mar. 10, 2016. The disclosures of these prior applications are considered part of the disclosure of this application and are hereby incorporated by reference in their entireties.

FIELD

The present disclosure relates to a tire pressure monitoring system for a vehicle for ascertaining tire-specific parameters, having a valve body, at least one fastening element, and a tire inflation pressure sensor with a housing in which are accommodated means for determining at least one tire-specific parameter and for wirelessly transmitting the at least one tire-specific parameter to a control unit on the vehicle, wherein the housing has a fastening region, and the valve body includes a fastening section, and wherein the fastening section of the valve body is detachably engaged with the fastening region of the housing with the aid of a fastening element.

BACKGROUND

Vehicle safety and reliability are crucial aspects in automotive technology. If for no other reason than safety, therefore, the tire pressure of vehicles or motor vehicles should be checked regularly, even though this is often neglected by the vehicle driver. For this reason, increasing use is made in modern vehicles of sensing devices in the form of tire inflation pressure sensors that automatically measure the tire inflation pressure and transmit it to a control unit on the vehicle. This is intended to avoid failures or accidents that are attributable to insufficient tire inflation pressure. Consequently, a critical deviation of the measured tire inflation pressure from a desired tire pressure should be detected early through this automatic measurement of the tire inflation pressure and indicated to the vehicle driver, making it possible to dispense with manual monitoring. In such systems for automatic measurement of tire inflation pressure, one tire inflation pressure sensor is arranged on each wheel or pneumatic tire. A tire inflation pressure sensor in this context often includes at least one sensor for sensing the tire inflation pressure or temperature, as well as a transmitter unit and, if applicable, an electronic analysis unit, which can also be provided on the vehicle, however.

In FIGS. 1 and 2, a tire pressure monitoring system 100 of the initially described type is shown, which is known from DE 10 2010 050 365 A1, for example. This known system 100 includes a valve body 110, a tire inflation pressure sensor 120 and a fastening element 130 attaching the valve body 110 to the tire inflation pressure sensor 120, wherein the fastening element 130 is implemented as a screw. To install the valve body 110 on the tire inflation pressure sensor 120, the fastening section 150 of the valve body 110 is inserted into a receptacle 160 formed on the housing 140 of the tire inflation pressure sensor 120. The receptacle 160 has a hole 170 which extends transversely to the insertion direction of the valve body 110 and into which the fastening element 130 implemented as a screw is screwed in order to fasten the valve body 110 to the housing 140.

It is disadvantageous of this known tire pressure monitoring system 100 that there is the risk during the installation process that the fastening element 130 implemented as a screw is lost, and that an assembly aid in the form of a screwdriver is needed in order to make the screw connection that ultimately holds the valve body 110 on the housing 140 of the tire inflation pressure sensor 120.

Another tire pressure monitoring system 200 is shown in FIGS. 3 and 4. This tire pressure monitoring system 200 likewise corresponds to the initially described type, and is known from DE 10 2004 048 244 A1, for example. This known system 200 also has a valve body 210, a tire inflation pressure sensor 220 and a fastening element 230 attaching the valve body 210 to the tire inflation pressure sensor 220. However, in this tire pressure monitoring system 200, the fastening element 230 is implemented as a spring clip. Nevertheless, the valve body 210 in this design is also inserted into a receptacle 250 formed on the housing 240 of the tire inflation pressure sensor 220 in order to fasten the valve body 210 to the tire inflation pressure sensor 220. The receptacle 250 has an insertion slot 260 which extends transversely to the insertion direction of the valve body 210 and into which the fastening element 230 implemented as a spring clip is inserted in order to engage a recess 280 formed in the circumferential surface of the fastening section 270 of the valve body 210, and as a result to fasten the valve body 210 to the housing 240. In this known tire pressure monitoring system 200, as well, it is a disadvantage that a separate fastening element 230 is provided for installation, which makes the installation of the valve body 210 on the housing 240 more difficult.

SUMMARY

This section provides a general summary of the disclosure, and is not a comprehensive disclosure of its full scope or all of its features.

The object of the present disclosure is to create a solution that provides by simple design means a tire pressure monitoring system that is light, compact, economical and simple to install.

In a tire pressure monitoring system of the initially described type, the object is attained according to the present disclosure by the means that the fastening element is made as one piece with the housing of the tire inflation pressure sensor from a thermoplastic plastic. The housing, which is made as one piece with the fastening element, may be made as an injection-molded part.

Advantageous and useful embodiments and improvements of the present disclosure are evident from the dependent claims.

By means of the present disclosure, a tire pressure monitoring system for a vehicle for ascertaining tire-specific parameters is provided that is distinguished by a functional design and has a simple and economical construction. Because the fastening element is made as one piece with the housing of the tire inflation pressure sensor, tool-free installation and removal of the valve body and tire inflation pressure sensor can be carried out. In addition to tool-free installation and removal, the component count of the tire pressure monitoring system is reduced, which is advantageously reflected in a reduction in manufacturing costs. In this design, the one-piece component consisting of housing and fastening element can be manufactured economically and in quantity by an injection molding process. The term "one-piece" should be understood in the present disclosure as a synonym for the expression "single-piece." "One-piece" in the meaning of the present disclosure means that the fastening element and the housing are manufactured together from one material.

For tool-free installation, the present disclosure provides in a concrete embodiment that the fastening section of the valve body has a ramp-like inclined surface that is molded on the circumferential surface of the valve body and over which the elastically supported fastening element can be pushed during installation of the valve body on the tire inflation pressure sensor in order to bring the fastening section of the valve body into engagement with the fastening element of the housing. For example, the fastening element can be designed as a snap hook that is deflected by the inclined surface during installation and engages a recess in the valve body after passage of the inclined surface in order to fasten the valve body to the housing.

Accordingly, the present disclosure makes provision in an embodiment that the fastening element has at least one latching hook that extends in the longitudinal direction of the valve body when the same is installed. During installation, the at least one latching hook is brought into engagement with a correspondingly designed region on the valve body.

In this regard, the present disclosure makes provision in another embodiment of the tire pressure monitoring system that, after installation of the valve body on the tire inflation pressure sensor, the at least one latching hook of the fastening element engages a recess formed on the connecting section of the valve body. The recess on the connecting section can be designed to extend partially around the circumference or to be fully circumferential.

As an alternative to the recess in the connecting section of the valve body, provision is made according to the present disclosure in an embodiment that, after installation of the valve body on the tire inflation pressure sensor, the at least one latching hook of the fastening element interlocks with a molded-on flange on the connecting section of the valve body.

Thus, what is important for both embodiments is that the fastening section of the valve body is designed such that the latching hook of the housing can be brought into engagement with the specially designed region of the fastening section in order to fasten the valve body to the housing of the tire inflation pressure sensor.

So that the at least one latching hook can cooperate with, for example, the fastening section designed as a ramp-like inclined surface, provision is made in an embodiment of the present disclosure that the at least one latching hook is held on the fastening region by at least one elastically deformable bearing arm such that it is movable relative to the housing. In this way, at least tool-free installation of the valve body on the tire inflation pressure sensor is possible.

With respect to the possibility of tool-free installation (and also removal), the present disclosure provides in another embodiment that the at least one bearing arm extends transversely to the longitudinal direction of the valve body when the same is installed, wherein the at least one bearing arm is designed in the manner of a torsion bar by means of which the at least one latching hook can be brought out of engagement with the fastening section of the valve body in the event of a rotating motion about the axis of rotation of the at least one bearing arm.

To this end, it is advantageous for an alternative embodiment if the at least one bearing arm is parallel to the longitudinal direction of the valve body when the same is installed, wherein the at least one bearing arm, at its end, is supported on the housing by its lengthwise end that faces away from the latching hook and is designed in the manner of a spring arm that brings the at least one latching hook out of engagement with the valve body in the event of a rotating motion away from the longitudinal direction of the valve body.

As a concrete embodiment of the alternative, the present disclosure provides that the at least one latching hook is designed as an elastically rotatable, U-shaped clip that grips a fastening projection molded on the fastening section of the valve body after installation of the valve body on the tire inflation pressure sensor.

For an entirely alternative implementation of a fastening element designed as one piece with the housing, the present disclosure provides in an embodiment that the fastening element has a locking cap designed in the form of a cover, which is connected to the housing by a living hinge, wherein the fastening region of the housing is box-like in design, and the locking cap is detachably fastened to the box-like fastening region after installation of the valve body on the tire inflation pressure sensor, and in the process is engaged with the fastening section of the valve body.

For tool-free installation of the fastening element of this alternative implementation, the present disclosure provides in an embodiment that the box-like fastening region of the housing has at least one locking bar that extends transversely to the longitudinal direction of the valve body when the same is installed, and at least one locking opening designed to be complementary to the at least one locking bar is formed in the locking cap, wherein the locking cap is fastened to the housing by a clamped connection that is formed by the locking bar clamped in the at least one locking opening after the installation of the locking cap on the fastening region, attaching the fastening section of the valve body in a locking manner.

For attaching the valve body to the alternative fastening element, provision is then additionally made that a locking projection, which extends from the locking cap transversely to the longitudinal direction of the valve body when the valve body is installed, interlocks with a tab molded on the connecting section of the valve body in such a manner that motion of the valve body in its longitudinal direction away from the housing is prevented.

The present disclosure provides in another embodiment of the tire pressure monitoring system that the fastening section of the valve body has, at least in sections, a flattening, and the fastening region of the housing has a plug-in receptacle designed to be complementary to the flattening so that the fastening section of the valve body can be inserted into the plug-in receptacle in a twistproof manner for installing the valve body on the tire inflation pressure sensor.

It is especially advantageous, moreover, if the thermoplastic plastic is polyamide, polypropylene, or polybutylene terephthalate. Polyamide (PA), as, for example, with the chemical name PA 6 GF 30, has the properties of being wear-resistant, UV-resistant, weather-resistant, very strong, resistant to many oils, greases, and fuels, and highly thermostable. Polypropylene (PP), in contrast, is characterized by high heat resistance and weather resistance as well as high hardness. Polybutylene terephthalate (PBT) likewise has high strength, stiffness and hardness, and is weather-resistant.

Finally, the present disclosure provides in another embodiment that the thermoplastic plastic is filled with a filler, wherein the filler has hollow glass spheres or glass fibers or a mixture of hollow glass spheres and glass fibers. The use of a thermoplastic plastic with a filler makes it possible to significantly reduce the weight of the one-piece component consisting of housing and fastening element, wherein the filler also has an advantageous effect on the manufacturing process of the one-piece component since the one-piece component may be an injection-molded part, wherein, for example, the hollow glass spheres as filler improve the flow characteristics or the melt flow during injection molding.

It is a matter of course that the features mentioned above and those to be explained below need not be used only in the specific combinations given, but may also be used in other combinations or alone without departing from the scope of the present disclosure. The scope of the present disclosure is defined only by the claims.

DRAWINGS

Additional details, features, and advantages of the subject matter of the present disclosure are evident from the description below in conjunction with the drawings, in which embodiments of the present disclosure are shown. The drawings show:

FIG. 1 is a tire pressure monitoring system known from the prior art in a perspective view.

FIG. 2 is the known tire pressure monitoring system from FIG. 1 in a perspective exploded view.

FIG. 3 is another tire pressure monitoring system known from the prior art in a perspective view.

FIG. 4 is the known tire pressure monitoring system from FIG. 3 in a perspective exploded view.

DETAILED DESCRIPTION

Figure 5:
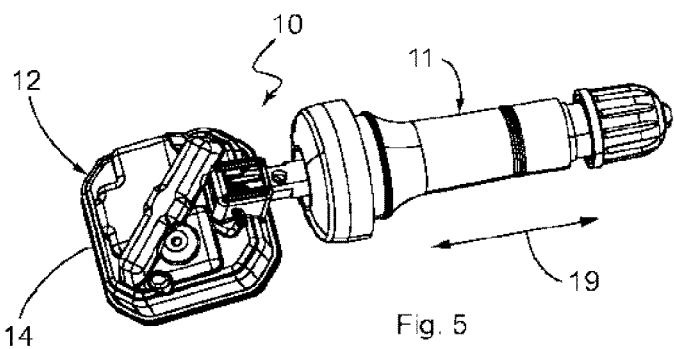
FIG. 5 is a tire pressure monitoring system according to the present disclosure in a perspective view.
Figure 6:
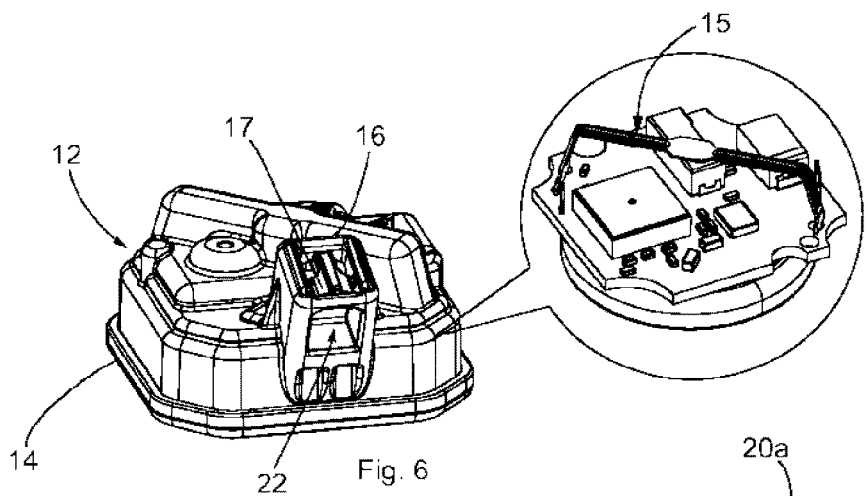
FIG. 6 is a housing of a tire pressure sensor of the tire pressure monitoring system from FIG. 5 in a perspective view.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Shown in FIGS. 5 to 14 is a tire pressure monitoring system 10 according to the present disclosure. The tire pressure monitoring system 10 can, as is well known, be used in a vehicle and serves to ascertain tire-specific parameters such as, e.g., air pressure or temperature. The tire pressure monitoring system 10 shown in FIG. 5 includes a valve body 11 and a tire inflation pressure sensor 12. The tire inflation pressure sensor 12 has a housing 14, which is shown in detail in FIG. 6, and in or on which are accommodated means 15 (a sensor 15 by way of example in FIG. 6) for determining at least one tire-specific parameter and for wirelessly transmitting the at least one tire-specific parameter to a control unit on the vehicle. The housing 14 has a fastening region 16, which projects chimney-like from the housing 14 and serves to attach the valve body 11.

Figure 7:
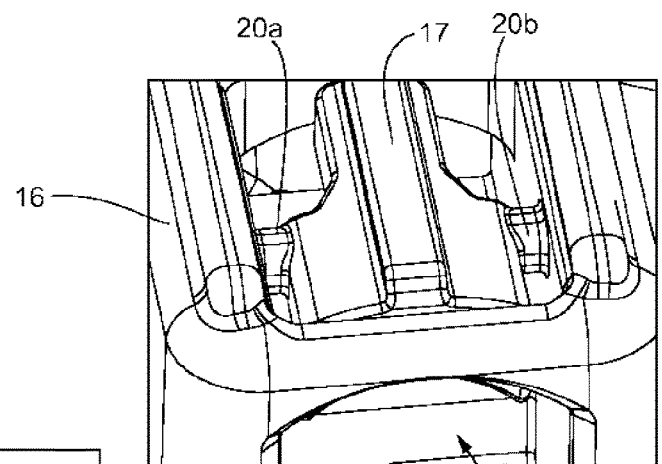
FIG. 7 is an enlarged view of a fastening region of the tire pressure sensor from FIG. 6 in a perspective view.
Figure 8:
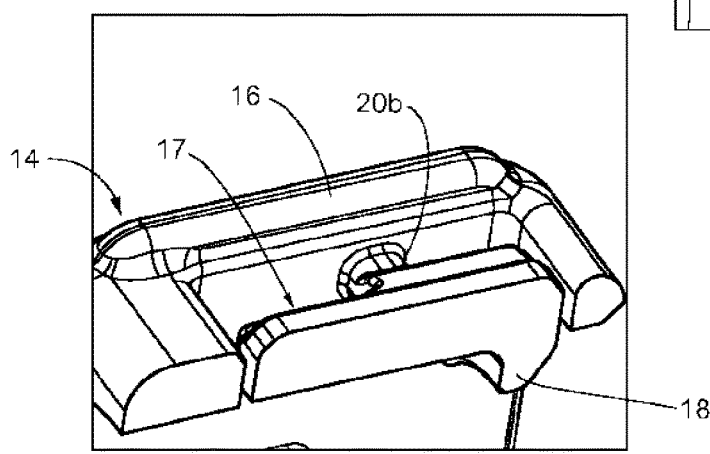
FIG. 8 is a fastening element of the tire pressure sensor in a cross-sectional side view.

The fastening region 16 includes a fastening element 17, which is shown in detail in FIGS. 7 and 8. According to the present disclosure, the fastening element 17 is made as one piece with the housing 14 of the tire inflation pressure sensor 12, and has a latching hook 18. The latching hook 18 extends in the longitudinal direction 19 of the valve body 11 when the valve body 11 is installed (see FIG. 5, for example). By means of two lateral bearing arms 20a and 20b, which are elastically deformable, the latching hook 18 is held on the fastening region 16 of the housing 14, and is movable relative to the housing 14. It is a matter of course that, in an alternative variation, only a single bearing arm may also be provided in order to hold the latching hook. The bearing arms 20a, 20b extend transversely to the latching hook 18 and transversely to the longitudinal direction 19 of the installed valve body 11, and permit a rotating motion of the latching hook 18 about the axis of rotation 21 of the two bearing arms 20a, 20b so that each of the two bearing arms 20a, 20b is designed in the manner of a torsion bar or torsion spring and functions accordingly. When the latching hook 18 rotates about the axis of rotation 21, the two bearing arms 20a and 20b twist, which is to say that no deflection of the bearing arms 20a, 20b takes place.

The fastening region 16 of the housing 14 has a plug-in receptacle 22 (see FIG. 6), which is located below the fastening element 17, and serves to receive a fastening section 23 (see, for example, FIGS. 9 and 12) of the valve body 11 that can be placed in the plug-in receptacle 22. To orient an opening 24 of the valve body 11 through which air can be delivered to the tire of the vehicle, the fastening section 23 of the valve body 11 has a flattening 25 (see, for example, FIGS. 9 and 12), wherein the plug-in receptacle 22 is designed to be complementary to the fastening section 23 with flattening 25 so that the fastening section 23 of the valve body can be inserted and is inserted into the plug-in receptacle 22 in a twistproof manner for installing the valve body 11 on the housing 14 of the tire inflation pressure sensor 12.

The insertion of the fastening section 23 of the valve body 11 into the plug-in receptacle 22 of the housing 14 has the result that the fastening element 17 is brought into engagement with the fastening section 23, which is discussed below with reference to FIGS. 9 to 14.

Figure 9:
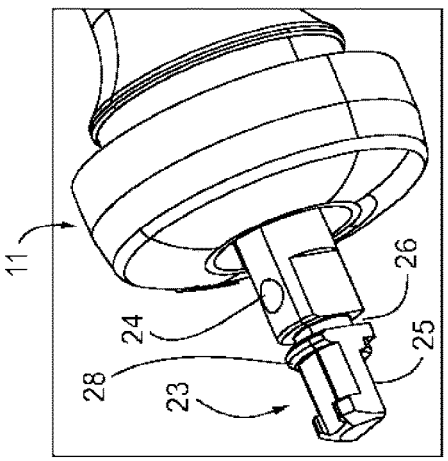
FIG. 9 is an enlarged view of a valve body of the tire pressure monitoring system from FIG. 5.
Figure 10:
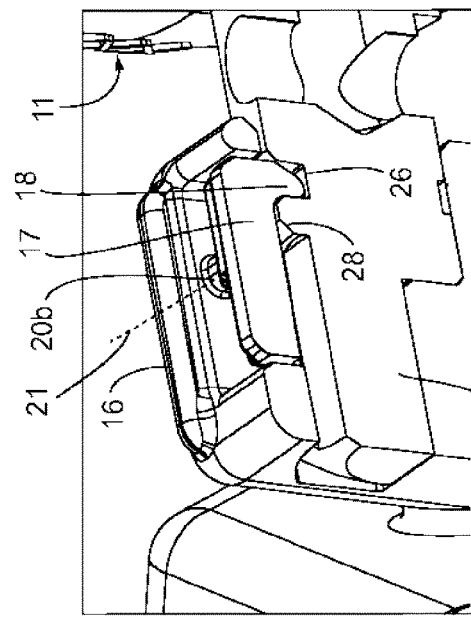
FIG. 10 is a cross-sectional side view of the fastening element engaged with the valve body from FIG. 9.
Figure 11:
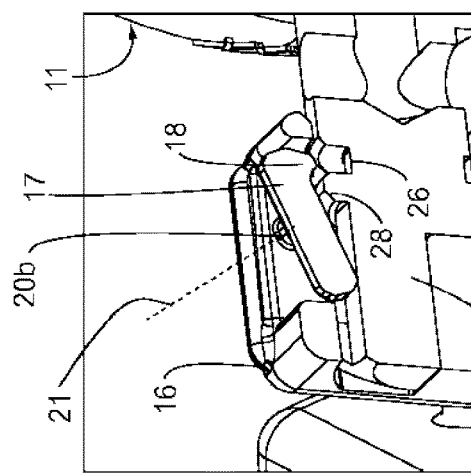
FIG. 11 is a cross-sectional side view of the fastening element, which is no longer engaged with the valve body from FIG. 9.
Figure 12:
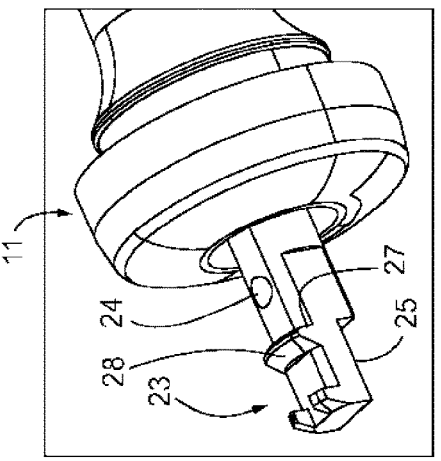
FIG. 12 is an enlarged view of another valve body of the tire pressure monitoring system from FIG. 5.
Figure 13:
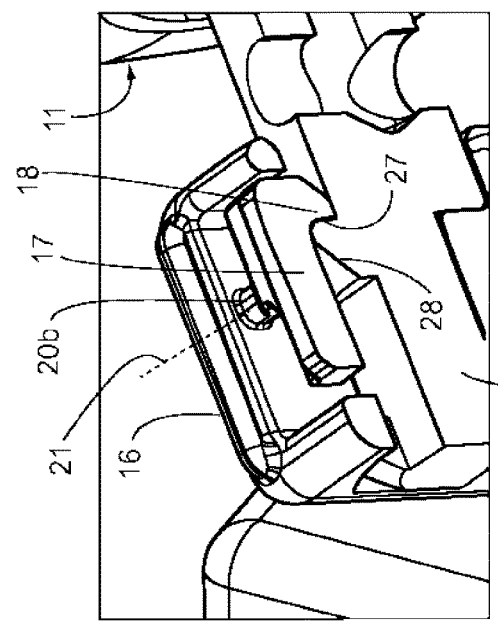
FIG. 13 is a cross-sectional side view of the fastening element engaged with the valve body from FIG. 12.
Figure 14:
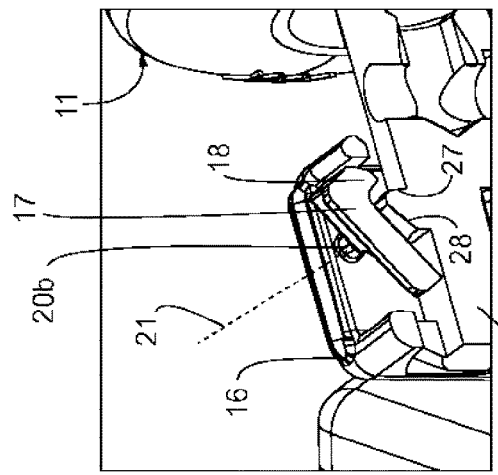
FIG. 14 is a cross-sectional side view of the fastening element, which is no longer engaged with the valve body from FIG. 12.
Figure 15:
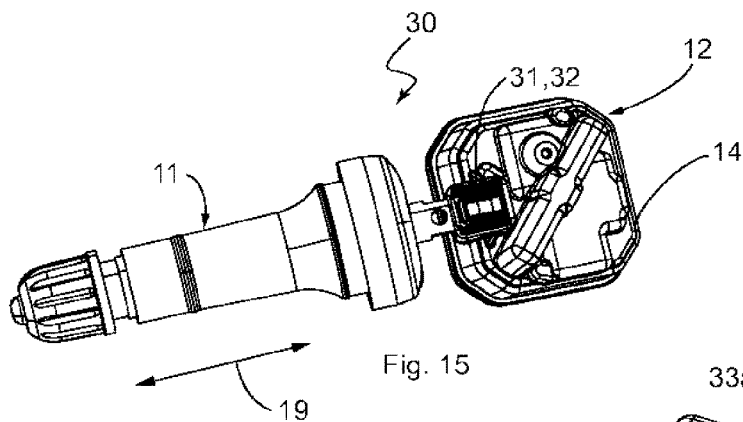
FIG. 15 is another tire pressure monitoring system according to the present disclosure in a perspective view.
Figure 16:
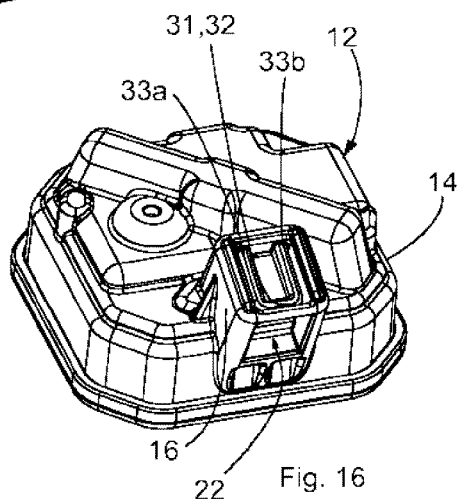
FIG. 16 is a housing of the tire pressure sensor of the tire pressure monitoring system from FIG. 15 in a perspective view.
Figure 17:
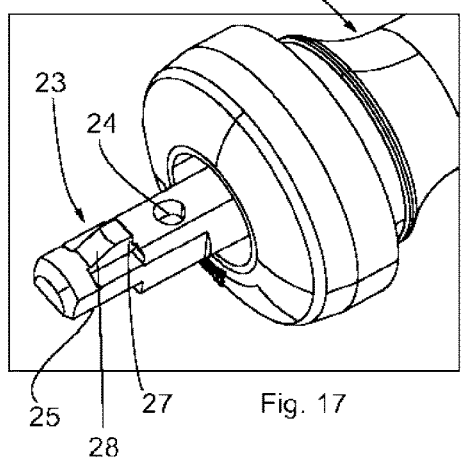
FIG. 17 is a perspective view of an enlarged view of a valve body according to the tire pressure monitoring system from FIG. 15.

FIGS. 9 and 12 show two different variants of the valve body 11, wherein the variants differ in the design of the applicable fastening section 23. In FIG. 9, the fastening section 23 of the valve body has a recess 26, which in the concrete embodiment is designed to be fully circumferential about the circumference of the valve body 11. A design of the recess 26 that extends only partially around the circumference is also possible, wherein it is necessary to ensure with the recess 26 that the latching hook 18 of the fastening element 17 can engage the recess 26 in order to fasten the valve body 11 to the tire inflation pressure sensor 12. FIG. 10 shows how the latching hook 18 engages the recess 26 so that the valve body 11 cannot be pulled out of the plug-in receptacle 22 of the housing. As an alternative to the recess 26, according to the variant in FIG. 12 a flange 27 is provided that is molded on the fastening section 23 on the side thereof facing away from the flattening 25. When the valve body 11 is installed on the tire inflation pressure sensor 12, the latching hook 18 of the fastening element 17 interlocks with the flange 27 so that the valve body 11 cannot be pulled out of the plug-in receptacle 22 of the fastening region 16, which is shown in FIG. 13. As shown in FIGS. 10 and 13, the latching hook 18 is engaged with the recess 26 or with the flange 27, so that in other words the fastening section 23 of the valve body 11 is also detachably engaged with the fastening region 16 of the housing 14 with the aid of the fastening element 17. The two variants of the valve body 11 each have, as a common feature, a ramp-like inclined surface 28 molded on the circumferential surface of the valve body, which in the first variant of the valve body 11 from FIG. 9 borders the recess 26, and in the second variant of the valve body 11 from FIG. 12 is designed as part of the flange 27. The inclined surface 28 serves the purpose that, during installation of the valve body 11 on the tire inflation pressure sensor 12, the latching hook 18 elastically supported on the fastening region 16 is pushed over the inclined surface 28 without a tool being needed for this purpose. Once the elastically deflected latching hook 18 has passed the inclined surface 28, it engages the recess 26 (see FIG. 10) or interlocks with the flange 27 (see FIG. 13) in order to bring the fastening section 23 of the valve body 11 into engagement with the fastening element 17 of the housing 14. In any case, due to its elastic properties, the fastening element 17 moves back into its initial position after passing the inclined surface 28, as a result of which the fastening element 17 comes into engagement with the fastening section 23 of the valve body 11. In this context, FIGS. 10 and 13 show a locked position for the latching hook 18, whereas an unlocked position of the latching hook 18 is shown in each of FIGS. 11 and 14. In the unlocked position, the latching hook 18 is brought out of engagement with the fastening section 23 of the valve body 11, which is possible due to the two bearing arms 20a, 20b, which permit a rotating motion of the latching hook 18 about the axis of rotation 21 of the two bearing arms 20a, 20b so that the two bearing arms 20a, 20b each act in the manner of a torsion bar or torsion spring, as already explained above. The rotating motion of the latching hook 18 is accompanied by a rotation of the bearing arms 20a, 20b about their axis of rotation 21, by which means the fastening element is brought out of engagement with the fastening section 23 of the valve body 11.

FIGS. 15 to 19 show another tire pressure monitoring system 30 according to the present disclosure. This tire pressure monitoring system 30 also includes a valve body 11 and a tire inflation pressure sensor 12 with a housing 14 in which are accommodated the means for determining tire-specific parameters, wherein the depiction thereof is omitted, particularly since the means are measures known from the prior art.

In the tire pressure monitoring system 30 as well, the valve body 11 and the tire pressure sensor 12 are detachably connected to one another by means of a fastening element 31, which is now designed differently, however. The fastening element 31 is again formed on the chimney-like fastening region 16 of the housing 14, as is evident from FIG. 16, for example. In this design, the fastening element 31 is designed with a bow shape or as a U-shaped clip 32. The bar connecting the two legs of the U-shaped clip 32 corresponds to the latching hook 18 in terms of its function, wherein the two legs of the clip 32 define two bearing arms 33a, 33b for the latching hook 18. The two bearing arms 33a, 33b, which are parallel to the longitudinal direction 19 of the valve body 11, are elastic in design and are attached to the fastening region 16. More precisely, the lengthwise ends of the clip 31 that face away from the latching hook 18 are supported on the housing 14 and are each implemented in the manner of a spring arm. The fastening section 23 of the valve body 11 of the tire pressure monitoring system 30 likewise has a flange 27, which is defined as a fastening projection 33 (see FIG. 18 or 19, for example) that is molded on the fasting section 23 of the valve body 11. Alternatively, however, instead of the flange 27, it would also be possible for a recess to be formed on the fasting section 23 of the valve body 23 in which the latching hook 18 of the tire pressure monitoring system 30 engages.

Figure 18:
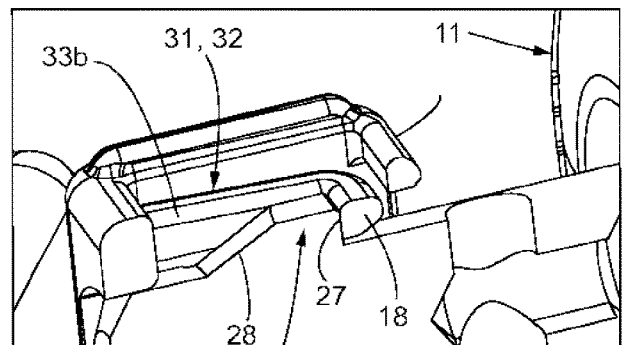
FIG. 18 is a cross-sectional side view of a fastening element engaged with the valve body from FIG. 16 according to the tire pressure monitoring system from FIG. 15.
Figure 19:
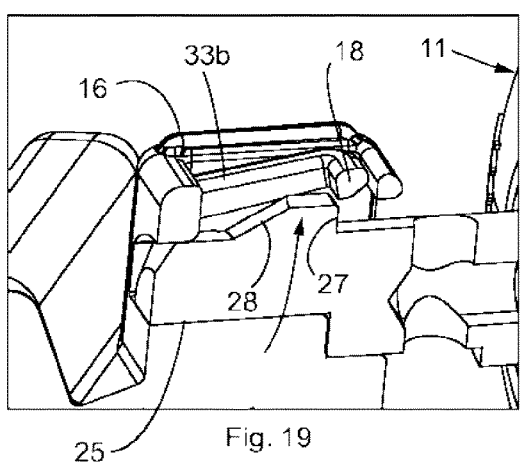
FIG. 19 is a cross-sectional side view of the fastening element from FIG. 18, which is no longer engaged with the valve body from FIG. 17.
Figure 20:
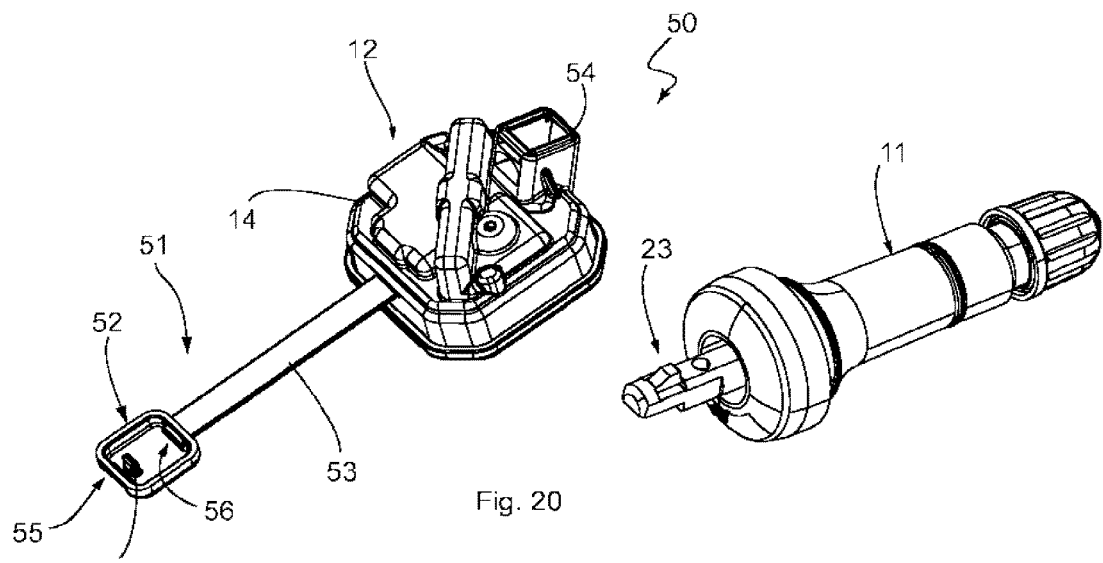
FIG. 20 is another tire pressure monitoring system according to the present disclosure in a perspective exploded view.

For the purposes of installing the valve body 11 on the tire inflation pressure sensor 12, the valve body 11 is introduced into the plug-in receptacle 22 of the fastening region 16 with its flattening 25 oriented appropriately, by which means the elastically rotatable, U-shaped clip 32 of the fastening element 31, which is designed as one piece with the housing 14, slides on the ramp-like inclined surface 28 and is rotated on account of the elastic bearing arms 33a, 33b until the clip 32 has passed the inclined surface 28 and then interlocks with the fastening projection 33, which corresponds to the locking position for the latching hook 18 that is shown in FIG. 18. Consequently, tool-free installation is possible wherein the U-shaped clip 32 deflects in the manner of a catch spring and grips the fastening projection 33. The fastening projection 33 corresponds essentially to the flange 27 already discussed above for the tire pressure monitoring system 10. In the locked position shown in FIG. 18, in which the valve body 11 is detachably attached to the tire inflation pressure sensor 12, the U-shaped clip 32 grips the fastening projection 33 that is molded on the fasting section 23 of the valve body 11 so that the valve body 11, which is located in the plug-in receptacle 22, cannot be pulled out of the same.

In order to remove the valve body 11 from the tire inflation pressure sensor 12, the U-shaped clip 32 must be rotated so that it is no longer blocking the path of motion of the fastening projection 33. In other words, the U-shaped clip 32 must be moved into the unlocked position shown in FIG. 19 in which the latching hook 18 is brought out of engagement with the fastening section 23 of the valve body 11 so that the valve body 11 can be pulled out of the plug-in receptacle 22 in the longitudinal direction 19. Unlike the case of the tire pressure monitoring system 10, the latching hook 18 or the fastening element 31 or the U-shaped clip 32, at its end, is supported on the housing 14 by its lengthwise end that faces away from the latching hook 18 and is designed in the manner of a spring arm that brings the latching hook 18 out of engagement with the valve body 11 or the fastening projection 33 of the valve body 11 in the event of a rotating motion of the latching hook 18 away from the longitudinal direction 19 of the valve body 11.

Another tire pressure monitoring system 50 according to the present disclosure is shown in FIGS. 20 to 24. The tire pressure monitoring system 50 again includes the valve body 11 and the tire inflation pressure sensor 12. The valve body 11 is to be attached to the tire inflation pressure sensor 12 with the aid of a fastening element 51 made as one piece with the housing 14 of the tire inflation pressure sensor 12. In the tire pressure monitoring system 50, the fastening element 51 has a locking cap 52 designed in the form of a cover, which is connected to the housing 14 by a hinge-like band. The hinge-like band constitutes a living hinge 53, which is made as one piece with the locking cap 52 and the housing 14. With the aid of the living hinge 53, the locking cap 52 is movable relative to the actual housing 14 even though the locking cap 52 of the fastening element 51 is made as one piece with the housing 14.

Figure 21:
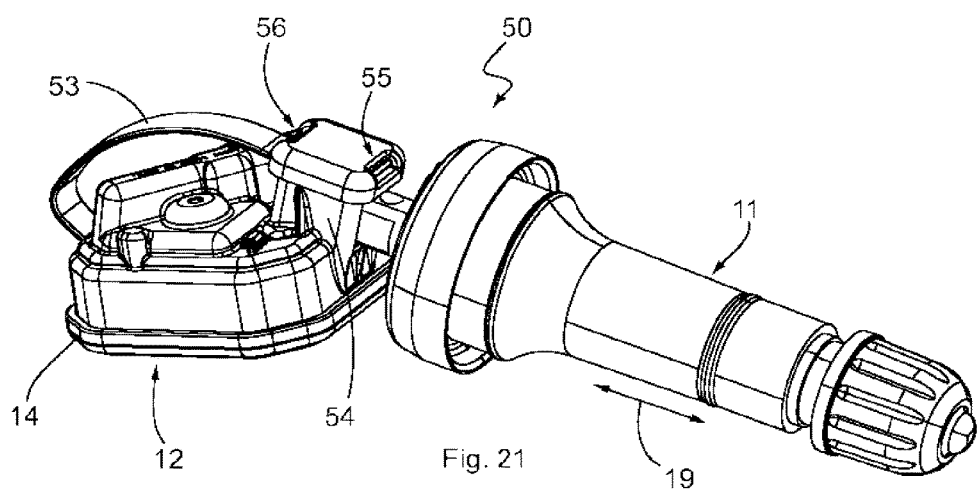
FIG. 21 is the tire pressure monitoring system from FIG. 20 with valve body installed on the tire pressure sensor.
Figure 22:
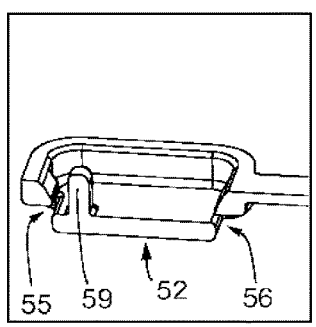
FIG. 22 is an enlarged cross-sectional view of the fastening element of the tire pressure monitoring system from FIG. 20.
Figure 23:
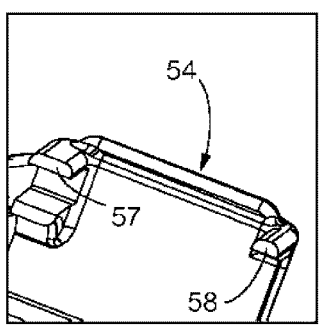
FIG. 23 is an enlarged cross-sectional view of a fastening region of a housing of a tire pressure sensor of the tire pressure monitoring system from FIG. 20.

The housing 14 has a box-like and chimney-like fastening region 54 (see FIG. 20, for example), onto which the locking cap 52 of the fastening element 51 can be pressed, by which means the locking cap 52 locks with the fastening region 54, and is detachably fastened to the fastening region 54 by means of the locking, as is shown in FIG. 21.

Formed in the locking cap 52 are two locking openings 55, 56, which are located one behind the other in the longitudinal direction 19 of the valve body 11, and which extend transversely to the longitudinal direction 19. The locking openings 55, 56, which are more easily visible in a cross-sectional perspective side view in FIG. 22, cooperate with appropriately formed locking bars 57 and 58 in the fastening region 54, which can be seen in FIG. 23. For installation, the locking cap 52 is pressed onto the fastening region 54, as a result of which the locking bars 57 and 58 of the fastening region 54 are pressed into the locking openings 55, 56 of the locking cap 52, which is possible due to the elastic material of the housing 14 (and thus of the locking cap 52 and the fastening region 54).

Figure 24:
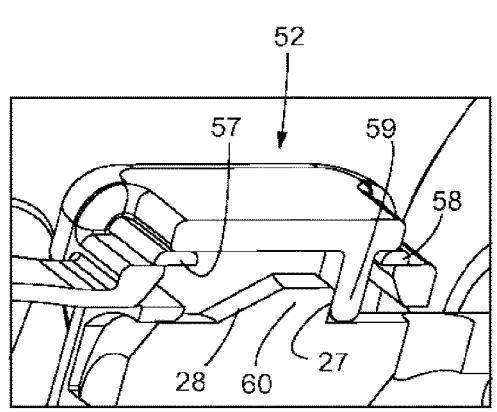
FIG. 24 is the tire pressure monitoring system from FIG. 20 after installation of the valve body on the housing.

The locking cap 52 can be pressed onto the fastening region 54 after the fastening section 23 of the valve body 11 has been pushed into the plug-in receptacle 22 of the housing 14. With this approach, during the pressing on, a locking projection 59, which extends from the locking cap 52 transversely to the longitudinal direction 19 of the valve body 11 when the valve body 11 is inserted in the plug-in receptacle 22, then interlocks with a tab 60 molded on the fastening section 23 of the valve body 11 in such a manner that a motion of the valve body 11 in its longitudinal direction 19 away from the housing 14 is prevented. This locked position is shown in FIG. 24.

However, the locking cap 52 can also be pressed onto the fastening region 54 before the fastening section 23 of the valve body 11 has been pushed into the plug-in receptacle 22 of the housing 14. Then, the locking projection 59 is located in the path of motion of the valve body 11 when the latter is pushed into the plug-in receptacle 22 of the housing 14. Since the locking projection 59 is elastic in design, the pushed-in fastening section 23 of the valve body 11 pushes the locking projection 59 out of the path of motion, which is assisted by the ramp-like inclined surface 28 that is molded on the fastening section 23 of the valve body 11 and transitions into the tab 60, which is comparable to the flange 27. When the inclined surface 59 has passed the locking projection 59, the locking projection 59 will deform back elastically and interlock with the tab 60 in such a manner that a motion of the fastening section out of the plug-in receptacle 22 is prevented. Consequently, the locking cap 52 is in engagement with the fastening section 23 of the valve body 11.

In other words, the box-like fastening region 54 of the housing 14 has the locking bars 57, 58 that extend transversely to the longitudinal direction 19 of the valve body 11 when the same is installed, wherein the locking openings 55, 56 that are designed to be complementary to the locking bars 57, 58 are formed in the locking cap 52. The locking cap 52 is fastened to the housing 14 by a clamped connection that is formed after the installation of the locking cap 52 on the fastening region 54 by the locking bars 57, 58 clamped in the locking openings 55, 56, and prevents or locks a motion of the fastening section 23 of the valve body 11.

In order to remove the valve body 11 from the tire inflation pressure sensor 12, it is only necessary to take the locking cap 52 off of the fastening region 54 of the housing 14 again, causing the locking projection 59 to leave the path of motion of the valve body 11 so that the latter can be pulled out of the plug-in receptacle 22 with no resistance and no obstruction.

If identical reference characters are used to describe the above embodiments, they refer to like or identical elements or components in each case, so that any one description of the elements or components of one embodiment also applies to the other embodiments.

In summary, the tire pressure monitoring system according to the present disclosure is distinguished by the fact that the fastening element 17, 31, 51 is made as one piece with the housing 14 of the tire inflation pressure sensor 12 from a thermoplastic plastic. In this case the thermoplastic plastic can be polyamide, polypropylene, or polybutylene terephthalate. Moreover, the thermoplastic plastic can be filled with a filler, wherein the filler can have hollow glass spheres or glass fibers or a mixture of hollow glass spheres and glass fibers The above-described present disclosure is, of course, not restricted to the embodiments described and shown. It is evident that numerous modifications obvious to the person skilled in the art in accordance with the intended application can be made to the embodiments shown in the drawings without thereby departing from the scope of the present disclosure. The present disclosure includes everything that is contained in the description and/or in the drawings, including those things obvious to the person skilled in the art that differ from the concrete exemplary embodiments.

The invention claimed is:

1. A tire pressure monitoring system for a vehicle for ascertaining tire-specific parameters, the tire pressure monitoring system including a valve body, at least one fastening element, and a tire inflation pressure sensor having a housing in which is accommodated a sensor for determining at least one tire-specific parameter and for wirelessly transmitting the at least one tire-specific parameter to a control unit on the vehicle,
   wherein the housing has a fastening region, and the valve body includes a fastening section,
   wherein the fastening section of the valve body is detachably engaged with the fastening region of the housing with the aid of a fastening element,
   wherein the fastening element and the housing of the tire inflation pressure sensor are integrally formed from a thermoplastic plastic, and
   wherein the fastening section of the valve body includes a ramp-like inclined surface that is molded on a circumferential surface of the valve body and over which an elastically supported fastening element can be pushed during installation of the valve body on the tire inflation pressure sensor in order to bring the fastening section of the valve body into engagement with the fastening element of the housing.

2. The tire pressure monitoring system according to claim 1, wherein the fastening element has at least one latching hook that extends in a longitudinal direction of the valve body when the valve body is installed.

3. The tire pressure monitoring system according to claim 2, wherein, after installation of the valve body on the tire inflation pressure sensor, the at least one latching hook of the fastening element engages a recess formed on the fastening section of the valve body.

4. The tire pressure monitoring system according to claim 2, wherein, after installation of the valve body on the tire inflation pressure sensor, the at least one latching hook of the fastening element interlocks with a molded-on flange on the fastening section of the valve body.

5. The tire pressure monitoring system according to claim 2, wherein the at least one latching hook is held on the fastening region by at least one elastically deformable bearing arm such that it is movable relative to the housing.

6. The tire pressure monitoring system according to claim 5, wherein the at least one bearing arm extends transversely to the longitudinal direction of the valve body when the valve body is installed, wherein the at least one bearing arm includes a torsion bar configured to bring the at least one latching hook out of engagement with the fastening section of the valve body upon a rotating motion about an axis of rotation of the at least one bearing arm.

7. The tire pressure monitoring system according to claim 5, wherein the at least one bearing arm is parallel to the longitudinal direction of the valve body when the valve body is installed, wherein the at least one bearing arm includes an end supported on the housing by its lengthwise end that faces away from the latching hook, and includes a spring arm that brings the at least one latching hook out of engagement with the valve body upon a rotating motion away from the longitudinal direction of the valve body.

8. The tire pressure monitoring system according to claim 7, wherein the at least one latching hook is designed as an elastically rotatable, U-shaped clip that grips a fastening projection molded on the fastening section of the valve body after installation of the valve body on the tire inflation pressure sensor.

9. The tire pressure monitoring system according to claim 1, wherein the fastening element has a locking cap having a cover, which is connected to the housing by a living hinge, wherein the locking cap is detachably fastened to a box-like fastening region of the housing after installation of the valve body on the tire inflation pressure sensor, and in the process is engaged with the fastening section of the valve body.

10. The tire pressure monitoring system according to claim 9, wherein the box-like fastening region of the housing has at least one locking bar that extends transversely to a longitudinal direction of the valve body when the valve body is installed, and at least one locking opening designed to be complementary to the at least one locking bar is formed in the locking cap, wherein the locking cap is fastened to the housing by a clamped connection that is formed by the locking bar clamped in the at least one locking opening after the installation of the locking cap on the fastening region, attaching the fastening section of the valve body in a locking manner.

11. The tire pressure monitoring system according to claim 9, wherein a locking projection, which extends from the locking cap transversely to a longitudinal direction of the valve body when the valve body is installed, interlocks with a tab molded on the fastening section of the valve body in such a manner that motion of the valve body in its longitudinal direction away from the housing is prevented.

12. The tire pressure monitoring system according to claim 1, wherein the fastening section of the valve body has, at least in sections, a flattening, and the fastening region of the housing has a plug-in receptacle designed to be complementary to the flattening so that the fastening section of the valve body can be inserted into the plug-in receptacle in a twistproof manner for installing the valve body on the tire inflation pressure sensor.

13. The tire pressure monitoring system according to claim 1, wherein the thermoplastic plastic is polyamide, polypropylene, or polybutylene terephthalate.

14. The tire pressure monitoring system according to claim 1, wherein the thermoplastic plastic is filled with a filler, wherein the filler has hollow glass spheres or glass fibers or a mixture of hollow glass spheres and glass fibers.

15. The tire pressure monitoring system according to claim 1, further comprising an elastically-deformable bearing arm coupled to, and integrally formed with, the fastening element and the housing.

16. The tire pressure monitoring system according to claim 15, wherein the fastening element is configured to rotate about an axis of rotation, and wherein the bearing arm is configured to twist about an axis parallel to the axis of rotation upon rotation of the fastening element about the axis of rotation.

17. A tire pressure monitoring system for a vehicle for ascertaining tire-specific parameters, the tire pressure monitoring system including a valve body, at least one fastening element, and a tire inflation pressure sensor having a housing in which is accommodated a sensor for determining at least one tire-specific parameter and for wirelessly transmitting the at least one tire-specific parameter to a control unit on the vehicle,
    wherein the housing has a fastening region, and the valve body includes a fastening section,
    wherein the fastening section of the valve body is detachably engaged with the fastening region of the housing with the aid of a fastening element,
    wherein the fastening element and the housing of the tire inflation pressure sensor are integrally formed from a thermoplastic plastic, and
    wherein the fastening element has at least one latching hook that extends in a longitudinal direction of the valve body when the valve body is installed.

18. The tire pressure monitoring system according to claim 17, wherein, after installation of the valve body on the tire inflation pressure sensor, the at least one latching hook of the fastening element engages a recess formed on the fastening section of the valve body.

19. The tire pressure monitoring system according to claim 17, wherein, after installation of the valve body on the tire inflation pressure sensor, the at least one latching hook of the fastening element interlocks with a molded-on flange on the fastening section of the valve body.

20. The tire pressure monitoring system according to claim 17, wherein the at least one latching hook is held on the fastening region by at least one elastically deformable bearing arm such that it is movable relative to the housing.

\* \* \* \* \*